Patented Nov. 2, 1937

2,097,474

UNITED STATES PATENT OFFICE 2,097,474

RUBBER COMPOSITION AND METHOD OF PRESERVING RUBBER

Waldo L. Semon, Silver Lake Village, Ohio, assignor to The B. F. Goodrich Company, New York, N. Y., a corporation of New York No Drawing. Original application March 20, 1931, Serial No. 524,217. Divided and this application March 26, 1935, Serial No. 13,086

6 Claims. (Cl. 18—50)

This invention relates to a method of producing a rubber composition having high resistance to deterioration under the influence of heat, light and exposure to air, and to a rubber composition made by such process. It has long been recognized that vulcanized rubber goods, such as tires, garden hose and other articles, when exposed to light, heat, and air, deteriorate with greater or less rapidity. As a consequence, attempts have been made to treat rubber compositions with substances which extend the useful life of manufactured rubber articles. To this end, it has been proposed to apply to the surface of manufactured rubber articles preservative compositions and also to introduce into the rubber mix before vulcanization materials generally classified under the term "anti-oxidants". A purpose of the present invention is to provide an anti-oxidant which shall be more effective in retarding the deteriorating influences hereinabove referred to and which shall be economical to manufacture and which need be used only in relatively small proportions in the rubber mix.

I have found that substances which are at the same time secondary aromatic amines and ethers, including thioethers, are particularly effective in retarding deterioration of rubber compositions in which they are incorporated. Although it is to be understood that these anti-oxidants may be used to prevent the deterioration and hardening of crude rubber in storage, they find their greatest usefulness when employed in conjunction with vulcanized rubber articles to increase the normal period of their usefulness.

The preferred substances of this invention are compounds containing only hydrocarbon groups attached to the secondary amino group and to the ether oxygen or sulphur; but neutral or basic substituents such as hydroxy groups, primary or tertiary amino groups, etc. may be present if desired. Strongly acidic groups such as carboxyl or sulphonic acid groups, or other substituents containing doubly bound oxygen, should be avoided, however, as they tend greatly to reduce the anti-oxidant power of the compounds.

The class of compounds described above includes, for example, p-methoxy diphenylamine, o-methoxy diphenylamine, m-methoxy diphenylamine, p-methoxy phenyl naphthylamine, p-methoxy phenyl biphenylamine, phenylamino methyl naphthol, methoxy phenyl toluidine, p,p'-dimethoxy diphenylamine, ethoxy diphenylamine, butoxy diphenylamine, benzoxy diphenylamine, p-phenyl amino diphenylether, p-naphthylamino diphenylether, p,p'-di(phenylamino) diphenylether, o,o'-di(phenylamino) diphenylether, p,p'-di(phenylamino) diphenyl sulphide, dibenzyl diamino diphenyl ether, diphenyl diamino diethyl sulphide, dinaphthyl diamino diethyl sulphide, dinaphthyl diamino diphenyl sulphide, dinaphthyl diamino diphenylether, diphenyl diamino diethylether, diphenyl diamino dibenzyl ether, dinaphthyl diamino diethylether, dianisyl ethylene diamine, dianisyl phenylene diamine, p-phenylamino p' dimethylamino diphenylether, mononaphthyl diamino diphenylether, dianisyl diamino diphenylether, ethyl mercapto diphenylamine, diphenyl dianisidine, methoxy p-isopropenyl diphenylamine, p-isopropenylphenylamino diphenylether, etc.

When incorporated into rubber compositions before vulcanization, preferably in the proportions of from ¼ to 5% of the rubber content of the composition, the anti-oxidants of this invention are extremely effective in retarding their deteriorations, compositions so treated being capable of withstanding the deleterious effect of exposure to oxidizing materials or to the elements for a far longer period than similar untreated compositions. The anti-oxidants may likewise be applied to the surface of vulcanized or unvulcanized rubber with good effect on its resistance to deteriorations, for example, in the form of a powder, paste, or solution.

As a specific example of one embodiment of the method of this invention, a typical tire tread composition was prepared containing blended plantation rubbers approximately 100 parts by weight, sulphur 5.5 parts, zinc oxide 30 parts, gas black 40 parts, mineral rubber 10 parts, palm oil 5 parts, and hexamethylene tetramine 0.75 part. The composition was divided into portions, certain of which were used as controls. Into the other portions were mixed a further 0.95 part (0.5% of the weight of the composition) of one of the above-described class of antioxidants. The compositions were thoroughly mixed, and vulcanized in a press for 45 minutes at 145° C. (294° F.) to produce an optimum cure.

The relative rate of aging of the vulcanized compositions were compared by measuring their respective tensile strengths and elongations before and after aging. Accelerated aging tests were carried out in the Geer aging oven, in which samples were maintained at a temperature of 70° C. (158° F.) in a constantly renewed stream of air, as well as in the Bierer-Davis bomb, in which other samples were maintained at the same temperature (70° C.) in an atmosphere of oxygen at a pressure of 300 lbs. per square inch. The results obtained are given in the following table in which T indicates ultimate tensile strength in pounds per square inch and E indicates ultimate elongation in per cent. of original length. Each of the tests is accompanied by a control test of the composition without the anti-oxidant.

erwise limited, is employed in the claims in a generic sense to include both oxygen ethers and thioethers.

This application is a division of my copending application Serial No. 524,217 filed March 20, 1931.

*Aging tests*

| Anti-oxidant | Before aging | | After 7 days in the Geer oven | | After 48 hours in the Bierer-Davis bomb | |
|---|---|---|---|---|---|---|
| | T | E | T | E | T | E |
| None (control) | 3,629 | 650 | 1,992 | 450 | 615 | 247 |
| Crude diphenyl diamino diethyl sulphide | 3,832 | 670 | 2,565 | 507 | 2,076 | 537 |
| Crude dinaphthyl diamino diethyl sulphide | 3,729 | 673 | 2,591 | 507 | 1,868 | 523 |
| None (control) | 3,350 | 603 | 1,890 | 447 | 790 | 297 |
| Crude diphenyl diamino diethylether | 3,670 | 650 | 2,320 | 517 | 1,770 | 493 |
| None (control) | 3,594 | 630 | | | 636 | 267 |
| Dinaphthyl diamino diphenylether | 3,650 | 657 | | | 2,081 | 620 |
| None (control) | 3,512 | 620 | 1,828 | 427 | 1,074 | 377 |
| Dinaphthyl diamino diphenyl sulphide | 3,527 | 787 | 2,615 | 543 | 2,617 | 583 |
| None (control) | 3,739 | 680 | 2,023 | 477 | 1,162 | 427 |
| p-Methoxy diphenylamine | 3,746 | 697 | 3,510 | 617 | 2,802 | 586 |
| None (control) | 3,665 | 645 | | | 520 | 235 |
| p-Ethoxy diphenylamine | 3,536 | 645 | | | 2,595 | 585 |
| p-Ethoxy phenyl naphthylamine | 3,620 | 670 | | | 2,750 | 615 |

It is evident from the above examples that rubber compositions containing even small proportions of the anti-oxidants of this invention resist deterioration far more effectively than similar untreated compositions.

Obviously, the practice of this invention is not limited to the specific compositions given above, such compositions being merely illustrative of one manner of employing the anti-oxidants of this invention. The anti-oxidants may be employed in conjunction with other known anti-oxidants, or with other vulcanizing agents or accelerators than those here specifically disclosed. The proportions of the constituents may be varied, or other substances may be substituted generally therefor, since this invention is applicable to pure rubber compositions of the most varied nature.

It is understood that the term "treating" as employed in the appended claims is used in a generic sense to include either the incorporation of the anti-oxidants into the rubber by milling or similar process, or their addition to the rubber latex before the coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta percha, rubber isomers and like products, whether or not admixed with fillers, pigments, vulcanizing or accelerating agents. The term "ether", unless oth- While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

I claim:

1. The method of preserving rubber which comprises treating rubber with an aromatic diamine in which each amino group is substituted only by a single alkoxy-aryl group.

2. The method of preserving rubber which comprises treating rubber with phenylene diamine in which each amino group is substituted only by a single alkoxy-aryl group.

3. The method of preserving rubber which comprises treating rubber with N,N' dianisyl phenylene diamine.

4. A rubber composition comprising rubber and an aromatic diamine in which each amino group is substituted only by a single alkoxy-aryl group.

5. A rubber composition comprising rubber and an arylene diamine in which each amino group is substituted only by a single alkoxy-aryl group.

6. A rubber composition comprising rubber and N,N' dianisyl phenylene diamine.

WALDO L. SEMON.